(12) United States Patent
Xu et al.

(10) Patent No.: US 12,500,242 B2
(45) Date of Patent: Dec. 16, 2025

(54) ELECTRODE ASSEMBLY AND BATTERY CELL

(71) Applicant: CONTEMPORARY AMPEREX TECHNOLOGY (HONG KONG) LIMITED, Hong Kong (CN)

(72) Inventors: Hu Xu, Fujian (CN); Miaomiao Ren, Fujian (CN); Yongshou Lin, Fujian (CN); Long Xu, Fujian (CN); Youlei Lai, Fujian (CN); Haizu Jin, Fujian (CN); Lingbo Zhu, Fujian (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 536 days.

(21) Appl. No.: 17/665,953

(22) Filed: Feb. 7, 2022

(65) Prior Publication Data

US 2022/0158197 A1 May 19, 2022

Related U.S. Application Data

(63) Continuation of application No. PCT/CN2020/102829, filed on Jul. 17, 2020.

(30) Foreign Application Priority Data

Aug. 14, 2019 (CN) .......................... 201910750738.2

(51) Int. Cl.
H01M 4/66 (2006.01)
(52) U.S. Cl.
CPC ................... H01M 4/667 (2013.01)
(58) Field of Classification Search
CPC .................................................. H01M 4/667
See application file for complete search history.

(56) References Cited

U.S. PATENT DOCUMENTS 7,258,948 B2 8/2007 Miyamoto et al.
8,865,335 B2 10/2014 Lei et al.
(Continued)

FOREIGN PATENT DOCUMENTS

CN 1525591 A 9/2004
CN 101442114 A 5/2009
(Continued)

OTHER PUBLICATIONS

Extended European Search Report dated Jul. 11, 2022 received in European Patent Application No. EP 20851621.1.
(Continued)

*Primary Examiner* — Nicole M. Buie-Hatcher
*Assistant Examiner* — Taylor Harrison Krone
(74) *Attorney, Agent, or Firm* — ANOVA LAW GROUP, PLLC

(57) ABSTRACT

An electrode assembly and a battery cell is disclosed. The electrode assembly includes a first electrode plate and a second electrode plate. The first electrode plate includes a first current collector and a first active material layer, the first current collector includes a first main body and a first tab, and the first tab extends from one end of the first main body in a longitudinal direction. The second electrode plate includes a second current collector and a second active material layer, the second current collector includes a second main body and a second tab, the second tab extends from one end of the second main body in the longitudinal direction, and the second active material layer is applied on a surface of the second main body.

15 Claims, 9 Drawing Sheets

(56) References Cited

U.S. PATENT DOCUMENTS

| | | | |
|---|---|---|---|
| 10,270,121 B2 | 4/2019 | Ide | |
| 10,411,243 B2 | 9/2019 | Tsuji et al. | |
| 2004/0202928 A1 | 10/2004 | Miyamoto et al. | |
| 2006/0051678 A1 | 3/2006 | Kim et al. | |
| 2006/0248710 A1* | 11/2006 | Fukumoto | H01M 4/0414 |
| | | | 29/623.5 |
| 2009/0162739 A1 | 6/2009 | Han et al. | |
| 2016/0181650 A1 | 6/2016 | Ide | |
| 2016/0359189 A1 | 12/2016 | Fukatsu et al. | |
| 2017/0047575 A1 | 2/2017 | Tsuji et al. | |
| 2017/0117530 A1* | 4/2017 | Choo | H01M 50/538 |
| 2017/0317390 A1 | 11/2017 | Sato | |
| 2018/0366786 A1* | 12/2018 | Fujii | H01M 4/13 |
| 2019/0355958 A1 | 11/2019 | Tsuji et al. | |
| 2020/0328427 A1* | 10/2020 | Yamada | H01M 4/624 |

FOREIGN PATENT DOCUMENTS

| | | | | |
|---|---|---|---|---|
| CN | 101662011 A | 3/2010 | | |
| CN | 101685856 A | 3/2010 | | |
| CN | 101894967 B | 7/2014 | | |
| CN | 204303913 U | 4/2015 | | |
| CN | 105609693 A | 5/2016 | | |
| CN | 106463761 A | 2/2017 | | |
| CN | 205960126 U | 2/2017 | | |
| CN | 206250284 U | 6/2017 | | |
| CN | 107256971 A | 10/2017 | | |
| CN | 208127309 U | 11/2018 | | |
| CN | 109088091 A | 12/2018 | | |
| CN | 208819984 U | 5/2019 | | |
| CN | 208819985 U | 5/2019 | | |
| CN | 210535760 U | 5/2020 | | |
| JP | 2020173942 | * | 4/2019 | H01M 4/13 |
| WO | 2013164998 A1 | 11/2013 | | |
| WO | 2015198526 A1 | 12/2015 | | |
| WO | 2016067706 A1 | 5/2016 | | |

OTHER PUBLICATIONS

First Notice of Review Observations dated Apr. 2, 2024 received in Chinese Patent Application No. CN 201910750738.2.
International Search Report dated Oct. 10, 2020 issued in PCT/CN2020/102829.
State Intellectual Property Office of China The First Office Action for Application No. 202411146718.1 May 27, 2025 11 pages (including translation).

* cited by examiner

ELECTRODE ASSEMBLY AND BATTERY CELL

CROSS-REFERENCE TO RELATED APPLICATIONS

This application is a continuation of International Application No. PCT/CN2020/102829, filed on Jul. 17, 2020, which claims priority to Chinese Patent Application No. 201910750738.2, filed on Aug. 14, 2019. The disclosures of the aforementioned applications are hereby incorporated by reference in their entireties.

TECHNICAL FIELD

Embodiments of this application relate to the field of batteries, and in particular, to an electrode assembly and a battery cell.

BACKGROUND

An electrode assembly of a secondary battery includes an electrode plate and a separator, and the electrode plate includes a current collector and an active material layer applied on a surface of the current collector. To facilitate electrical connection to electrode terminals of the secondary battery, tabs are usually obtained through cutting the current collector. Before cutting of the tabs, the current collector has a coated region on which the active material layer is applied and an uncoated region on which the active material layer is not applied, and the tabs are formed by cutting the uncoated region. During cutting of the tabs, a cutting tool is likely to act on the active material layer to cause a risk of falling-off of the active material layer, resulting in waste of materials.

SUMMARY

In view of the problem in the background, a plurality of aspects of this application provide an electrode assembly and a battery cell.

A first aspect of this application provides an electrode assembly, including a first electrode plate and a second electrode plate, where the first electrode plate includes a first current collector and a first active material layer, the first current collector includes a first main body and a first tab, and the first tab extends from one end of the first main body in a longitudinal direction. The first main body includes a first coated region and a first transition region, the first transition region is disposed between the first tab and the first coated region, the first active material layer is applied on a surface of the first coated region, and the first active material layer is not applied on both the first transition region and the first tab. The second electrode plate includes a second current collector and a second active material layer, the second current collector includes a second main body and a second tab, the second tab extends from one end of the second main body in the longitudinal direction, and the second active material layer is applied on a surface of the second main body. In a direction of the first main body toward the first tab, an edge of the first transition region farther away from the first coated region does not extend beyond an edge of the second active material layer.

Optionally, the first electrode plate is a positive electrode plate, the second electrode plate is a negative electrode plate, and in the direction of the first main body toward the first tab, the edge of the second active material layer extends beyond an edge of the first active material layer.

Optionally, in the direction of the first main body toward the first tab, the edge of the first transition region extends at least 0.5 millimeters (mm) beyond the edge of the first active material layer.

Optionally, the first electrode plate further includes an insulation layer, and the insulation layer is at least partially applied on a surface of the first transition region.

Optionally, the insulation layer includes a first portion and a second portion, the first portion is applied on the surface of the first transition region, and the second portion extends from the first portion and is applied on a surface of the first tab.

Optionally, in the direction of the first main body toward the first tab, an edge of the second portion farther away from the first portion extends beyond the edge of the second active material layer.

Optionally, in the direction of the first main body toward the first tab, the edge of the second portion farther away from the first portion extends 0.3 mm to 14 mm beyond the edge of the second active material layer.

Optionally, a hardness of the insulation layer is greater than a hardness of the first current collector.

Optionally, the insulation layer includes an inorganic filler and a binder, and a weight ratio of the inorganic filler to the binder is 4.1 to 9.6.

Optionally, the first tab and the second tab are located on a same side of the electrode assembly in the longitudinal direction. The second active material layer includes a substrate region and a thinned region extending from the substrate region, and a thickness of the thinned region is less than a thickness of the substrate region. In the longitudinal direction, the thinned region is connected to a side of the substrate region close to the second tab. The second electrode plate further includes a third active material layer, and the third active material layer is applied on a surface of the second tab and connected to the thinned region. In a direction of the thinned region toward the third active material layer, a size of the third active material layer is greater than a size of the thinned region.

Optionally, the second main body includes a second coated region and a second transition region, and the second transition region is disposed between the second tab and the second coated region. The second active material layer is applied on a surface of the second coated region, and the second active material layer is not applied on the second transition region.

Optionally, the electrode assembly further includes a separator, where the separator is used to isolate the first electrode plate from the second electrode plate.

A second aspect of this application provides a battery cell, including the electrode assembly.

In the electrode assembly and the battery cell described above, the first transition region is disposed on the current collector in the electrode assembly, so as to avoid the first active material layer from falling off during cutting of the first tab. In addition, the first transition region can reduce an action force transferred to the first active material layer during vibration of the battery cell, reducing a risk of falling-off of the first active material layer. Furthermore, an overlapping area between the first transition region and the second active material layer can be further reduced, to decrease a probability of falling impurities in between and reduce a risk of mutual contact and short circuits.

Figure 1:
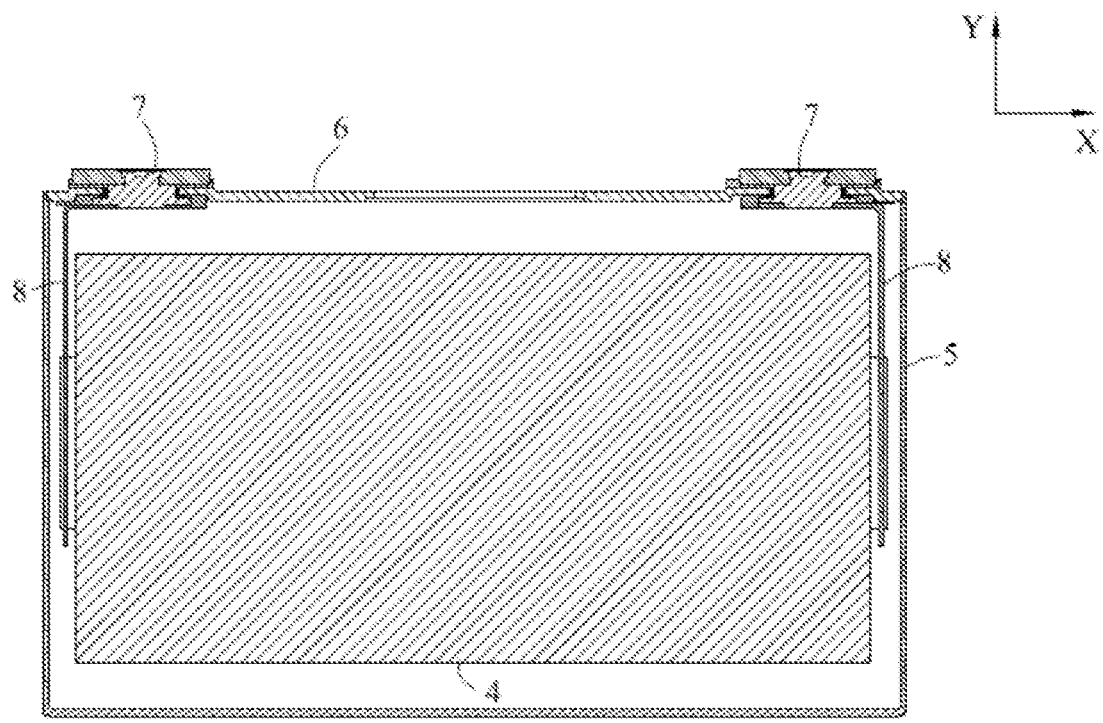
FIG. 1 is a schematic diagram of a secondary battery according to an embodiment of this application.

REFERENCE SIGNS 1. first electrode plate
11. first current collector
111. first main body
111a. first coated region
111b. first transition region
112. first tab
12. first active material layer
13. insulation layer
131. first portion
132. second portion
2. second electrode plate
21. second current collector
211. second main body
211a. second coated region
211b. second transition region
212. second tab
22. second active material layer
221. substrate region
222 thinned region
23. third active material layer
3. separator
4. electrode assembly
5. housing
6. top cover plate
7. electrode terminal
8. current collecting member
X. longitudinal direction
Y. lateral direction
Z. thickness direction

DETAILED DESCRIPTION OF EMBODIMENTS

To make the objectives, technical solutions, and advantages of this application more comprehensible, the following describes this application in detail with reference to the embodiments and accompanying drawings. It should be understood that the specific embodiments described herein are merely used to explain this application but are not intended to limit this application.

In the descriptions of this application, unless otherwise specified and defined explicitly, the terms "first", "second", and "third" are merely intended for a purpose of description, and should not be understood as any indication or implication of relative importance; the term "plurality of" indicates two or more (including two); and unless otherwise specified and defined explicitly, the term "connection" should be understood in its general senses. For example, the "connection" may be a fixed connection, a detachable connection, an integrated connection, or an electrical connection, or a signal connection; or may be a direct connection, or an indirect connection through an intermediate medium. A person of ordinary skill in the art can understand specific meanings of these terms in this application based on specific situations.

In the descriptions of the specification, it should be understood that the directional terms such as "up" and "down" described in the embodiments of this application are described from angles shown in the accompanying drawings, and should not be understood as a limitation on the embodiments of this application. The following further describes this application in detail with reference to specific embodiments and accompanying drawings.

Referring to FIG. 1, a secondary battery according to an embodiment of this application includes an electrode assembly 4, a housing 5, a top cover plate 6, an electrode terminal 7, and a current collecting member 8.

Figure 2:
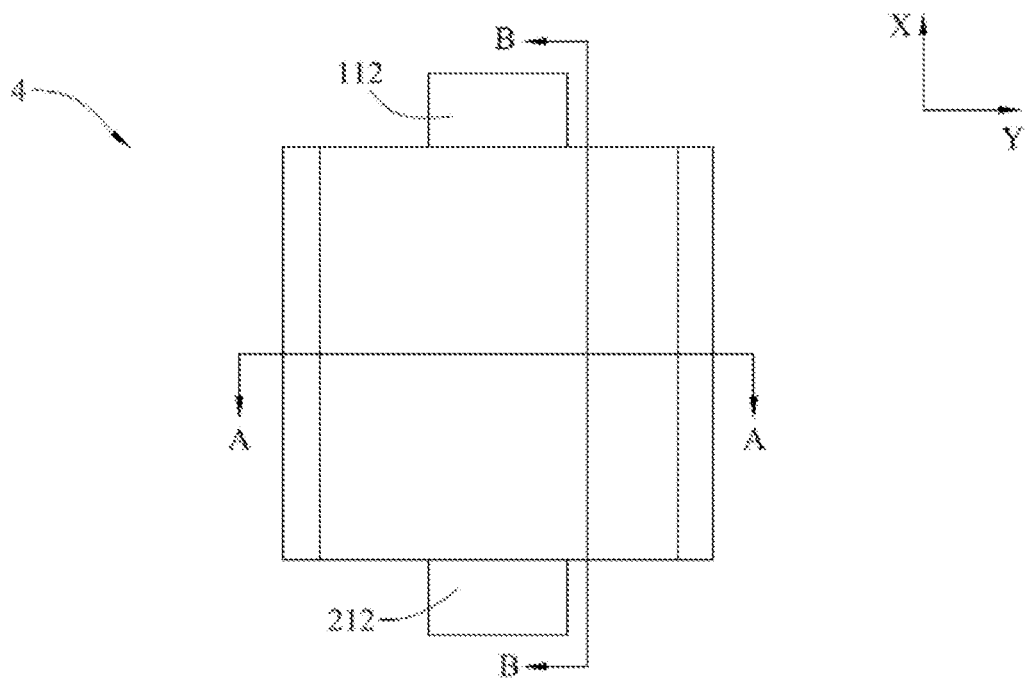
FIG. 2 is a schematic diagram of a first embodiment of an electrode assembly according to this application.
Figure 3:
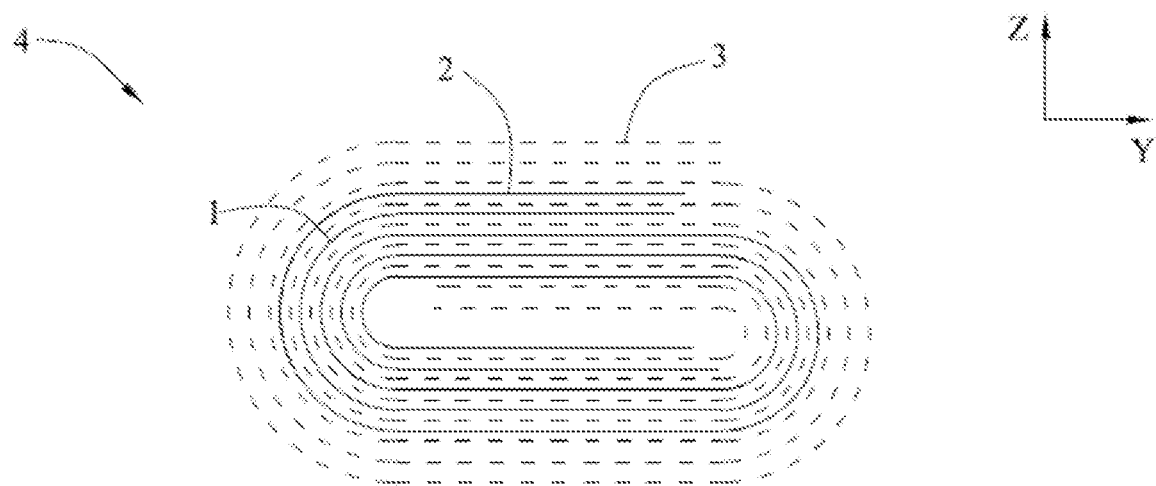
FIG. 3 is a cross-sectional diagram of an electrode assembly in FIG. 2 along a line A-A.

The electrode assembly 4 is a core component of the secondary battery for implementing charge and discharge functions. Referring to FIG. 2 and FIG. 3, the electrode assembly 4 includes a first electrode plate 1, a second electrode plate 2, and a separator 3, and the separator 3 isolates the first electrode plate 1 from the second electrode plate 2.

The electrode assembly 4 may be a winding structure. Specifically, there are one first electrode plate 1 and one second electrode plate 2, and the first electrode plate 1 and the second electrode plate 2 are both in a strip structure. The first electrode plate 1, the separator 3, and the second electrode plate 2 are stacked sequentially and wound two or more times to form the electrode assembly 4. The electrode assembly 4 may be flat-shaped.

Alternatively, the electrode assembly 4 may alternatively be in a laminated structure. Specifically, the first electrode plate 1 and the second electrode plate 2 are provided in plurality. The plurality of first electrode plates 1 and the plurality of second electrode plates 2 are alternately stacked, and the separator 3 isolates the first electrode plate 1 from the second electrode plate 2.

The housing 5 may be of a hexahedron shape or other shapes. An accommodating cavity is formed inside the housing 5, to accommodate the electrode assembly 4 and an electrolyte. An opening is formed at one end of the housing 5, and the electrode assembly 4 may be placed into the accommodating cavity of the housing 5 from the opening.

The housing 5 may be made of a conductive metal material. Optionally, the housing 5 may be made of aluminum or aluminum alloy.

The top cover plate 6 is disposed on the housing 5 and covers an opening of the housing 5 so as to seal the electrode assembly 4 in the housing 5. The top cover plate 6 may be a metal plate, and is welded to the housing 5. There are two electrode terminals 7 that are disposed on the top cover plate 6. There are two current collecting members 8, one current collecting member 8 is connected to one electrode terminal 7 and the first electrode plate 1 of the electrode assembly 4, and the other current collecting member 8 is connected to the other electrode terminal 7 and the second electrode plate 2 of the electrode assembly 4.

The electrode assembly of this application is described below by using different embodiments.

Figure 4:
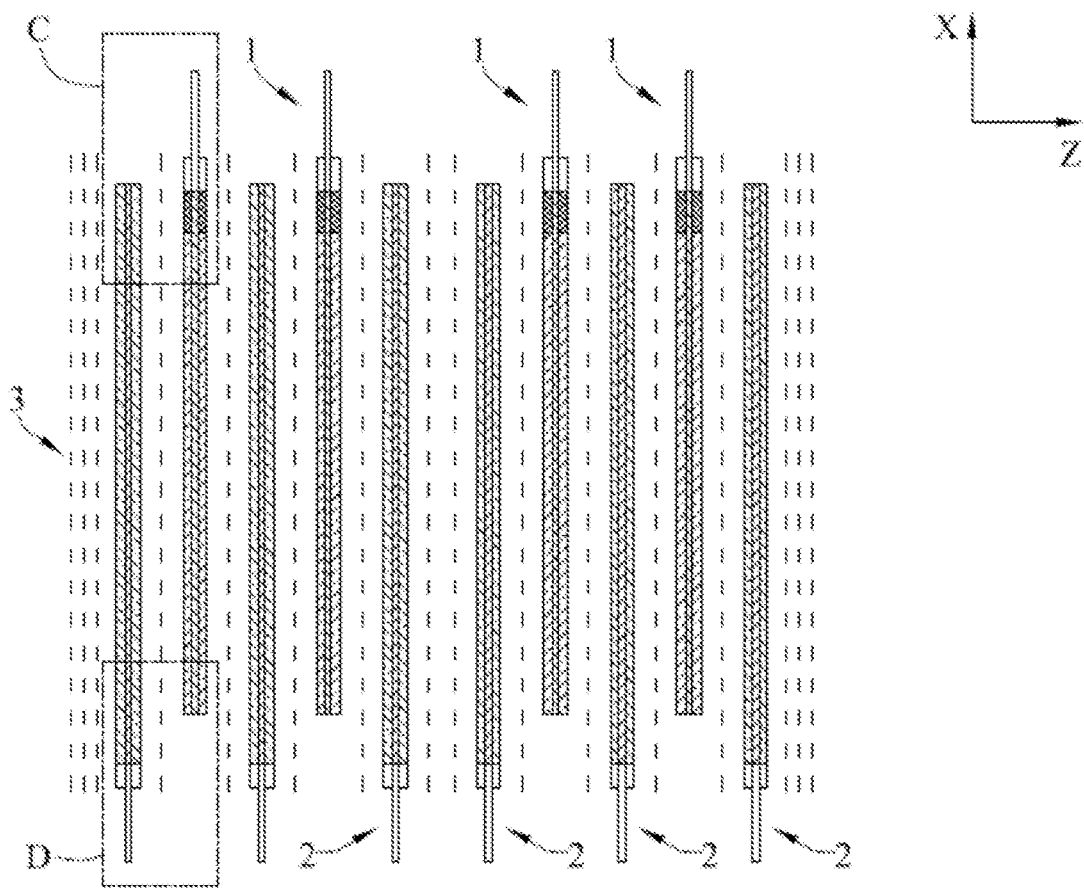
FIG. 4 is a cross-sectional diagram of an electrode assembly in FIG. 2 along a line B-B.
Figure 5:
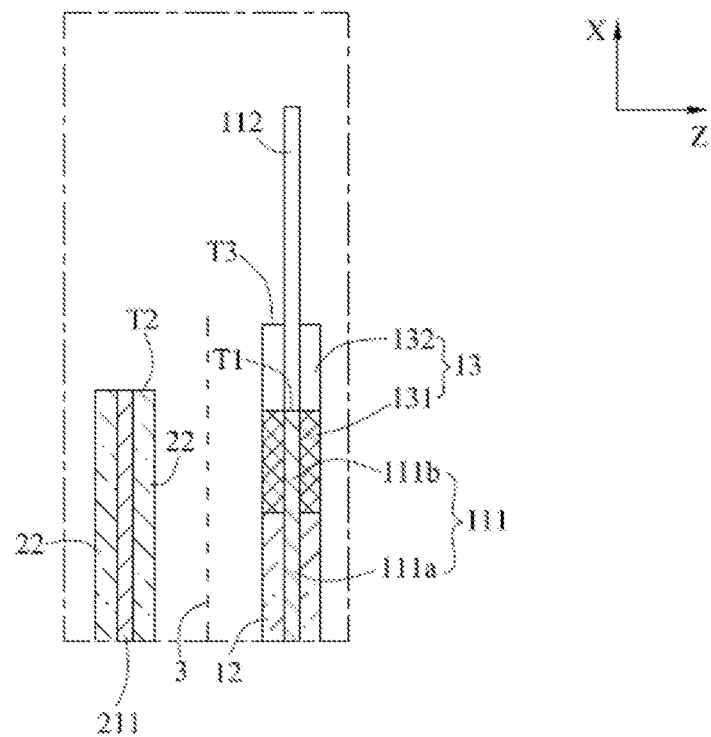
FIG. 5 is an enlarged view of an electrode assembly of FIG. 4 in a block C.
Figure 6:
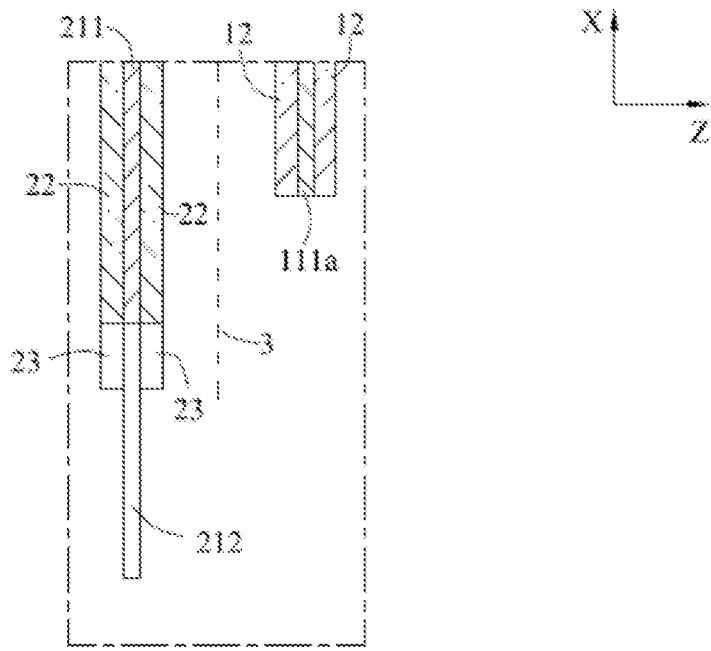
FIG. 6 is an enlarged view of an electrode assembly of FIG. 4 in a block D.

In a first embodiment, referring to FIG. 4 to FIG. 6, the first electrode plate 1 includes a first current collector 11 and a first active material layer 12, the first current collector 11 includes a first main body 111 and a first tab 112, and the first tab 112 extends from one end of the first main body 111 in a longitudinal direction X. The first active material layer 12 is applied on a surface of the first main body 111. The first electrode plate 1 may be a positive electrode plate; correspondingly, the first current collector 11 is an aluminum foil, and the first active material layer 12 includes a ternary material, lithium manganate oxide, or lithium iron phosphate. There may be a plurality of first tabs 112. After the first electrode plate 1 is wound up, the plurality of first tabs 112 are stacked together and welded to the current collecting member 8.

The second electrode plate 2 includes a second current collector 21 and a second active material layer 22. The second current collector 21 includes a second main body 211 and a second tab 212. The second tab 212 extends from one end of the second main body 211 in the longitudinal direction X, and the second active material layer 22 is applied on a surface of the second main body 211. The second electrode plate 2 may be a negative electrode plate; correspondingly, the second current collector 21 is a copper foil, and the second active material layer 22 includes graphite or silicon. There may be a plurality of second tabs 212. After the second electrode plate 2 is wound up, the plurality of second tabs 212 are stacked together and welded to the current collecting member 8.

In this embodiment, referring to FIG. 2, the first tab 112 and the second tab 212 are located on two sides of the electrode assembly 4 in the longitudinal direction X, respectively.

During use of the battery, lithium ions of the first active material layer 12 pass through the separator 3 and are intercalated into the second active material layer 22. To ensure that the lithium ions can be intercalated into the second active material layer 22 to a maximum extent and reduce a risk of lithium plating, the second active material layer 22 needs to be relatively large in width. Specifically, the second active material layer 22 extends beyond two ends of the first active material layer 12 in the longitudinal direction X. In other words, in a direction of the first main body 111 toward the first tab 112, one edge T2 of the second active material layer 22 close to the first tab 112 extends beyond one edge of the first active material layer 12 close to the first tab 112; and in a direction of the first tab 112 toward the first main body 111, the other edge of the second active material layer 22 farther away from the first tab 112 extends beyond the other edge of the first active material layer 12 farther away from the first tab 112.

During forming of the first electrode plate 1, the first tab 112 needs to be formed by cutting the first current collector 11. If cutting is performed along an edge of the first active material layer 12, a cutting tool is likely to act on the first active material layer 12 due to process errors, causing an active material of the first active material layer 12 to fall off and resulting in waste of materials. The active material of the first active material layer 12 is relatively expensive, and therefore cutting along the edge of the first active material layer 12 may result in relatively high costs of the first electrode plate 1.

To prevent the cutting tool from acting on the first active material layer 12, in this embodiment of this application, a size of the first main body 111 in the longitudinal direction X is increased to implement a larger distance between the first active material layer 12 and the first tab 112 in the longitudinal direction X. Specifically, referring to FIG. 5 to FIG. 9, the first main body 111 includes a first coated region 111a and a first transition region 111b, and the first transition region 111b is disposed between the first tab 112 and the first coated region 111a. The first active material layer 12 is applied on a surface of the first coated region 111a, and the first active material layer 12 is not applied on both the first transition region 111b and the first tab 112.

Figure 9:
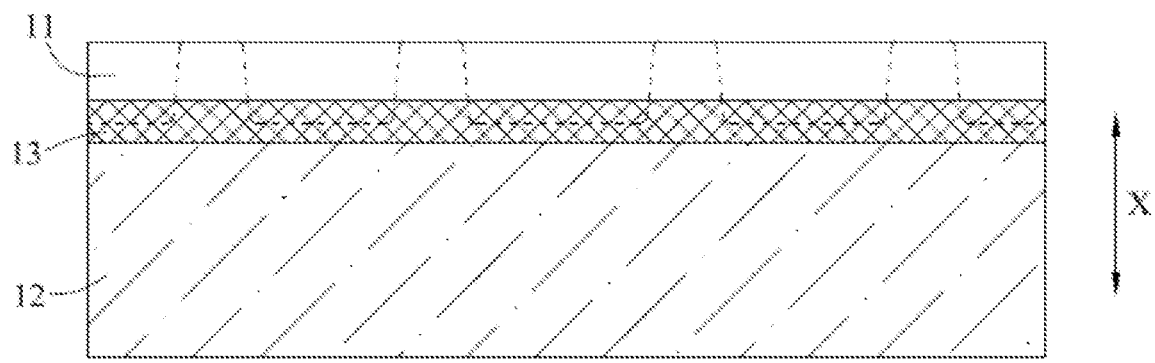
FIG. 9 is a schematic diagram of a first electrode plate in FIG. 7 in a forming process.

A dashed line in FIG. 9 shows a moving track of the cutting tool in a process of cutting the first tab 112. During cutting of the first tab 112, a given distance is kept between the cutting tool and the first active material layer 12. In order to prevent the cutting tool from acting on the first active material layer 12 due to process errors and prevent the active material of the first active material layer 12 from falling off, referring to FIG. 7 and FIG. 8, the first transition region 111b on which the first active material layer 12 is not applied is formed on the first main body 111 upon completion of the cutting.

During vibration of the secondary battery, the current collecting member 8 pulls the first main body 111 through the first tab 112. If no first transition region 111b is present, stress concentration occurs at a root of the first tab 112, and a portion of the first active material layer 12 close to the root of the first tab 112 is easy to fall off. In this embodiment of this application, the first transition region 111b is provided, so as to decrease an action force transferred to the first active material layer 12 and reduce a risk of falling-off of the active material of the first active material layer 12.

After the electrode assembly 4 is wound up, the first electrode plate 1 and the second electrode plate 2 are stacked together. The first active material layer 12 is applied on the surface of the first coated region 111a, and therefore a gap between the first coated region 111a and the second active material layer 22 of the second electrode plate 2 is relatively small. The first active material layer 12 is not applied on the first transition region 111b, and therefore a gap between the first transition region 111b and the second active material layer 22 of the second electrode plate 2 is relatively large.

Impurities (such as metal particles) may occur during welding of the first tab 112 and the current collecting member 8, and the impurities may easily fall into the gap between the first transition region 111b and the second active material layer 22 because the gap is relatively large. During charging and discharging, the first electrode plate 1 and the second electrode plate 2 may swell, to squeeze the impurities falling into the gap, so that the impurities may pierce the separator 3 to cause a risk of short circuits.

Optionally, referring to FIG. 5, in the direction of the first main body 111 toward the first tab 112, an edge T1 of the first transition region 111b farther away from the first coated region 111a does not extend beyond an edge T2 of the second active material layer 22. In this way, an overlapping area between the first transition region 111b and the second active material layer 22 can be reduced, thereby reducing a risk of mutual contact and short circuits. In addition, in this embodiment of this application, a size of the gap between the first transition region 111b and the second active material layer 22 in the longitudinal direction X is reduced, thereby reducing a risk of impurities falling into the gap. Furthermore, in the longitudinal direction X, the edge T1 of the first transition region 111b shrinks to the second active material layer 22, thereby reducing a risk of attaching impurities to the edge T1.

During cutting of the first tab 112, burrs may occur on the edge T1 of the first transition region 111b farther away from the first coated region 111a, and the burrs may easily pierce the separator 3.

During use of the battery, lithium ions of the first active material layer 12 pass through the separator 3 and are intercalated into the second active material layer 22. If the burrs on the edge T1 of the first transition region 111b come in contact with a lithium-intercalation region of the second active material layer 22, a large amount of heat may be generated instantaneously to cause a risk of explosions. If the burrs on the edge T1 of the first transition region 111b come in contact with a non-lithium-intercalation region of the second active material layer 22, less heat is generated with a lower safety risk.

During use of the battery, lithium ions of the first active material layer 12 spread around freely. Therefore, in the longitudinal direction X, a size of the lithium-intercalation region of the second active material layer 22 is slightly greater than a size of the first active material layer. To reduce safety risks, in the direction of the first main body 111 toward the first tab 112, the edge of the first transition region 111b extends 0.5 mm beyond the edge of the first active material layer 12. In other words, in the longitudinal direction X, a size of the first transition region 111b is greater than or equal to 0.5 mm. In this case, even if the burrs on the edge T1 of the first transition region 111b pierce the separator 3, the burrs may merely come in contact with the non-lithium-intercalation region of the second active material layer 22, thereby avoiding explosions and reducing safety risks.

Figure 7:
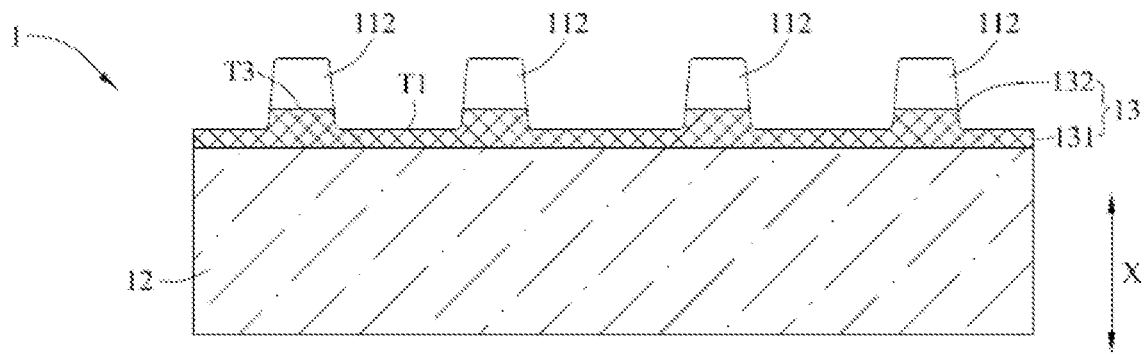
FIG. 7 is a schematic diagram of a first electrode plate in FIG. 4 in an unfolded state.
Figure 8:
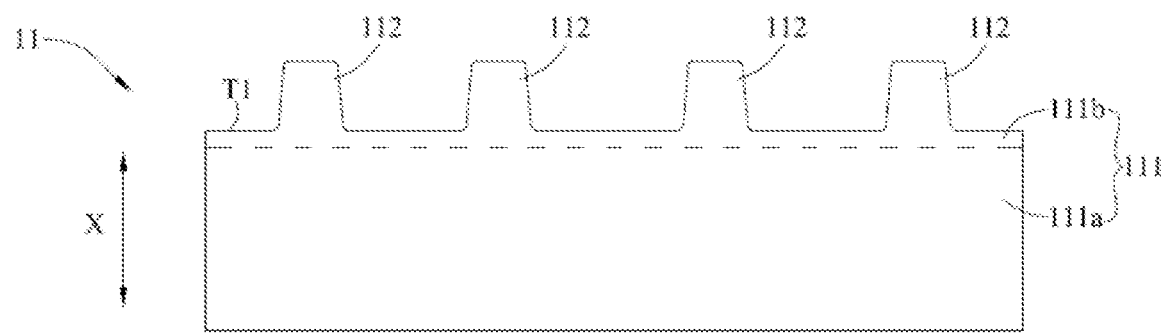
FIG. 8 is a schematic diagram of a first current collector of a first electrode plate in FIG. 7.

Referring to FIG. 5 and FIG. 7, the first electrode plate 1 further includes an insulation layer 13, and at least part of the insulation layer 13 is applied on a surface of the first transition region 111b. The insulation layer 13 may be filled in the gap between the first transition region 111b and the second active material layer 22 of the second electrode plate 2, thereby reducing impurities falling into the gap and further reducing a risk of short circuits. Furthermore, applying the insulation layer 13 on the first transition region 111b can also prevent the first transition region 111b from being electrically connected to the second active material layer 22 of the second electrode plate 2 through metal impurities.

The insulation layer 13 includes a first portion 131 and a second portion 132. The first portion 131 is applied on the surface of the first transition region 111b, and the second portion 132 extends from the first portion 131 and is applied on a surface of the first tab 112. Optionally, the first portion 131 is entirely applied on the surface of the first transition region 111b.

The first portion 131 may be filled in the gap between the first transition region 111b and the second active material layer 22 of the second electrode plate 2, thereby reducing impurities falling into the gap and further reducing a risk of short circuits. Furthermore, applying the first portion 131 on the surface of the first transition region 111b can prevent the first transition region 111b from being electrically connected to the second active material layer 22 of the second electrode plate 2 through metal impurities.

Referring to FIG. 9, in a forming process of the first electrode plate 1, the first active material layer 12 and the insulation layer 13 are first applied on a surface of the first current collector 11, and then the first tab 112 is obtained through cutting. The insulation layer 13 is usually applied in an equal-width manner. If the second portion 132 is not retained on the first tab 112, the cutting tool needs to move along an edge of the insulation layer 13 during cutting of the first tab 112. This imposes a relatively high precision requirement on the cutting, difficult for implementation. In addition, upon completion of the cutting, relatively large burrs occur on the edge T1 of the first transition region 111b, and are likely to pierce the separator 3.

Therefore, during cutting of the first tab 112 in this embodiment of this application, the cutting tool directly acts on the insulation layer 13. Upon completion of the cutting, the first portion 131 retained on the first transition region 111b and the second portion 132 retained on the first tab 112 are formed on the insulation layer 13. In addition, when the cutting tool performs cutting on the insulation layer 13, the burrs on the edge T1 of the first transition region 111b can be effectively reduced, thereby reducing a risk of piercing the separator 3.

Referring to FIG. 5, in the direction of the first main body 111 toward the first tab 112, an edge T3 of the second portion 132 farther away from the first portion 131 extends beyond the edge T2 of the second active material layer 22. The second portion 132 may be filled in the gap between the first tab 112 and the second active material layer 22, so as to reduce impurities falling into the gap and reduce a risk of short circuits. Furthermore, with the second portion 132, a risk that burrs on an edge of the first tab 112 are electrically connected to the second active material layer 22 after piercing the separator 3 can be further reduced.

There are a plurality of first tabs 112 that are stacked, and the plurality of first tabs 112 are gathered together and welded to the current collecting member 8. In a process of gathering the first tab 112, roots of some first tabs 112 close to the first transition region 111b are easily bent; as a result, the roots of these first tabs 112 insert between the first electrode plate 1 and the second electrode plate 2, causing a risk of short circuits. The second portion 132 in this embodiment of this application is capable of supporting the first tab 112, reducing a risk of bending the root of the first tab 112. In addition, the edge T3 of the second portion 132 extends beyond the edge T2 of the second active material layer 22; in this case, even if the first tab 112 is bent in a region on which the second portion 132 is not applied, a specific distance is kept between a bending position and the second active material layer 22, and a risk of the first tab 112 coming in contact with the second active material layer 22 is relatively low.

In the direction of the first main body 111 toward the first tab 112, the edge T3 of the second portion 132 farther away from the first portion 131 extends 0.3 mm to 14 mm beyond the edge of the second active material layer 22. If a size of the edge T3 of the second portion 132 extends less than 0.3 mm beyond the edge T2 of the second active material layer 22, when the first tab 112 is bent at a region on which the second portion 132 is not applied, a distance between a bending position and the second active material layers 22 is relatively small, and there is still a risk of contact between the first tab 112 and the second active material layer 22. If the edge T3 of the second portion 132 extends more than 14 mm beyond the edge T2 of the second active material layer 22, the first tab 112 has a low bending degree and occupies a large space, thereby affecting energy density of the secondary battery.

A hardness of the insulation layer 13 is greater than a hardness of the first current collector 11. The insulation layer 13 with higher hardness can effectively support the first tab 112 to avoid bending of the root of the first tab 112 close to the first transition region 111b.

The insulation layer 13 includes an inorganic filler and a binder, and a weight ratio of the inorganic filler to the binder is 4.1 to 9.6. If the ratio is greater than 9.6, adhesion of the inorganic filler and a bonding strength between the insulation layer 13 and the first current collector 11 may be insufficient, so that the insulation layer 13 is easy to fall off when the insulation layer 13 comes in contact with the electrolyte. If the ratio is less than 4.1, an insulation effect of the insulation layer 13 is difficult to meet a requirement; in addition, a relatively small volume of inorganic filler cannot play the role of supporting the first tab 112, and as a result, the first tab 112 is easily bent during winding of the first electrode plate 1. The inorganic filler may be selected from one or more of boehmite, aluminium oxide ($Al_2O_3$), silicon dioxide ($SiO_2$), and titanium dioxide ($TiO_2$). The binder may be polyvinylidene difluoride.

Figure 10:
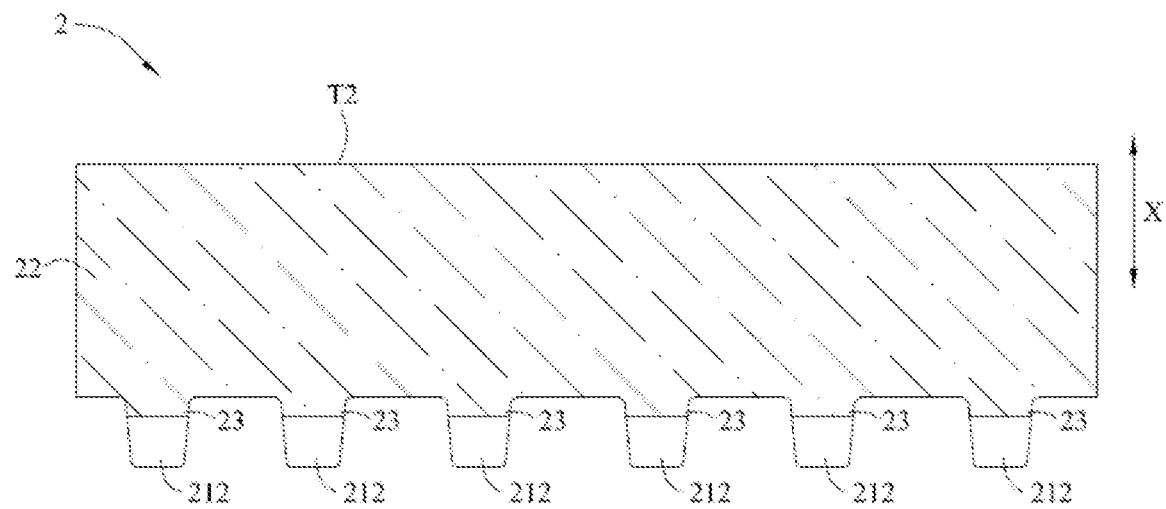
FIG. 10 is a schematic diagram of a second electrode plate in FIG. 4 in an unfolded state.
Figure 11:
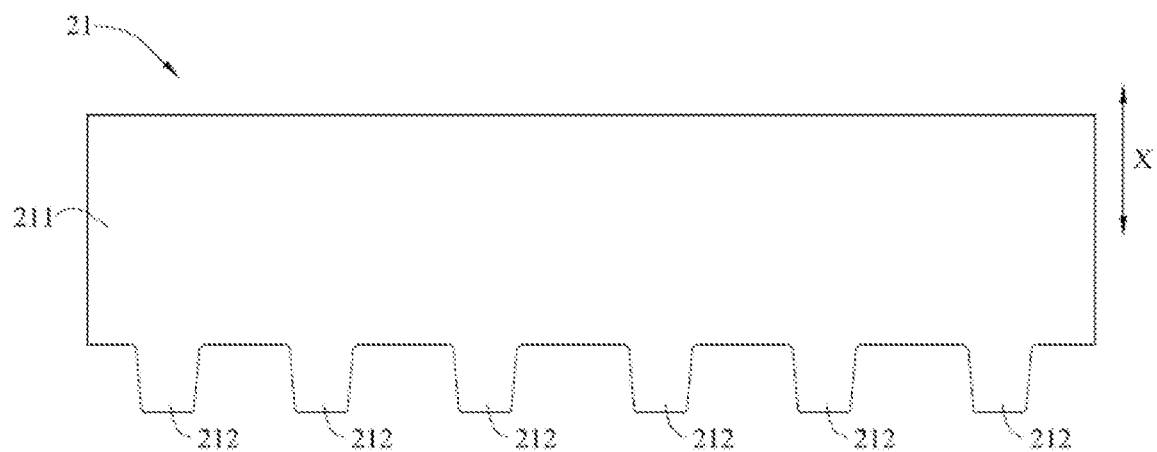
FIG. 11 is a schematic diagram of a second current collector of a second electrode plate in FIG. 10.
Figure 12:
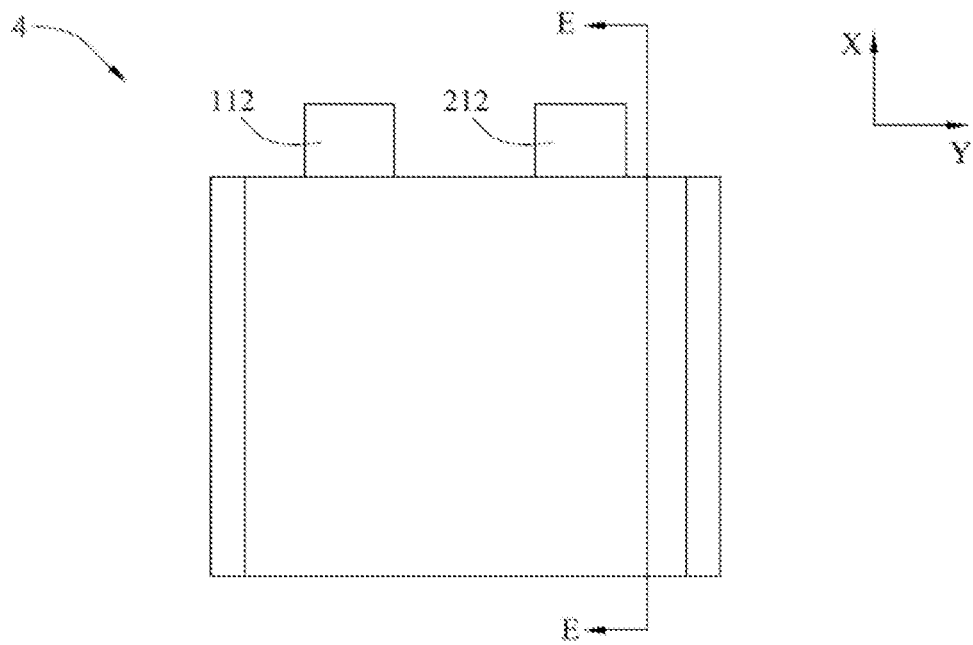
FIG. 12 is a schematic diagram of a second embodiment of an electrode assembly according to this application.
Figure 13:
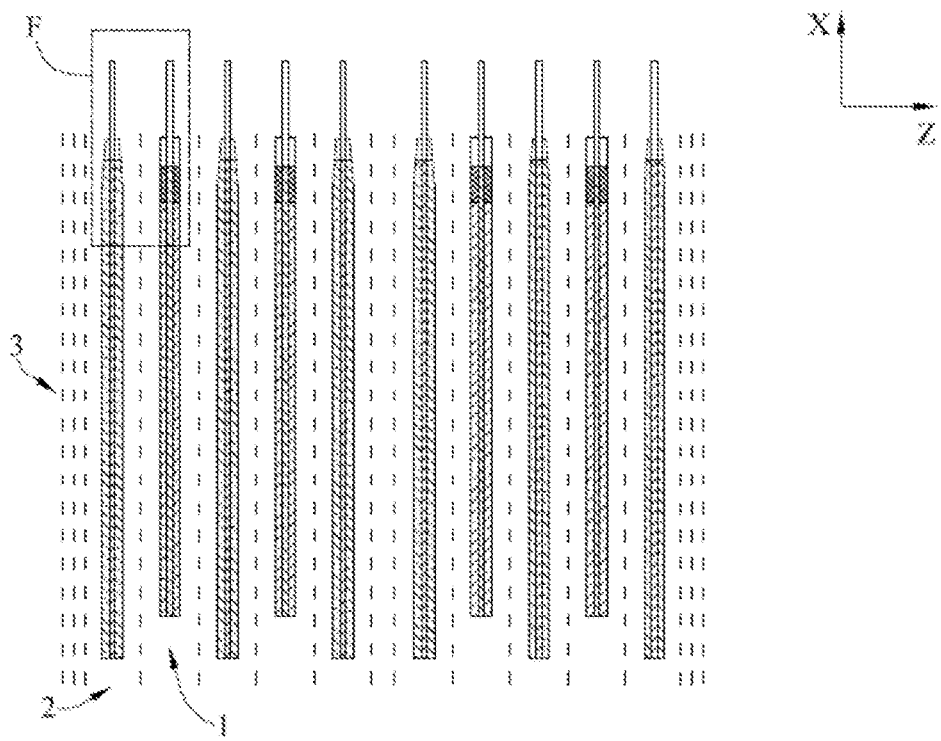
FIG. 13 is a cross-sectional diagram of an electrode assembly in FIG. 12 along a line E-E.

In this embodiment, referring to FIG. 10 and FIG. 11, the second active material layer 22 is entirely applied on the second main body 211. The second electrode plate 2 further includes a third active material layer 23, and the third active material layer 23 is applied on a surface of the second tab 212 and connected to the second active material layer 22. The second active material layer 22 and the third active material layer 23 are integrally formed.

Specifically, graphite, conductive agent acetylene black, thickener (such as carboxymethyl cellulose (Carboxymethyl Cellulose, CMC)), and binder (such as styrene butadiene rubber (Styrene Butadiene Rubber, SBR)) may be mixed, followed by adding a solvent, namely deionized water, and stirring, to form a negative electrode slurry. The negative electrode slurry is applied to a surface of the second current collector 21. The negative electrode slurry is solidified to form a negative electrode active material layer, and then cutting is performed to obtain the second tab 212. During cutting, the cutting tool may directly act on the negative electrode active material layer. Upon completion of the cutting, a portion of the negative electrode active material layer remaining on the second main body 211 is the second active material layer 22, and a portion of the negative electrode active material layer remaining on the second tab 212 is the third active material layer 23. Cutting on the negative active material layer can reduce burrs at a cutting position and reduce a risk of piercing the separator 3. Furthermore, an active material of the negative electrode active material layer has relatively low costs, and therefore part of the negative electrode active material layer can be directly cut out.

Other embodiments of the electrode assembly in this application are described below. For ease of description, the following mainly describes differences between other embodiments and the first embodiment. For those not described, refer to the first embodiment for understanding.

Referring to FIG. 12 to FIG. 15, in a second embodiment, a first tab 112 and a second tab 212 are both located on a side of an electrode assembly in a longitudinal direction X.

During forming of a second electrode plate 2, a second active material layer 22 generally needs to be cold pressed, so as to increase density of the second active material layer 22. During cold pressing, an end of the second active material layer 22 close to the second tab 212 is prone to stress concentration, causing a risk of breaking a second current collector 21.

Optionally, the second active material layer 22 includes a substrate region 221 and a thinned region 222 extending from the substrate region 221, and a thickness of the thinned region 222 is less than a thickness of the substrate region 221. In the longitudinal direction X, the thinned region 222 is connected to a side of the substrate region 221 close to the second tab 212. Optionally, in a direction leaving the substrate region 221, the thickness of the thinned region 222 gradually decreases.

In this embodiment of this application, with a smaller thickness of the thinned region 222, stress concentration at an edge T4 of the thinned region 222 farther away from the substrate region 211 can be reduced during cold pressing of the second electrode plate 2, so as to avoid breaking of the second current collector 21.

Figure 14:
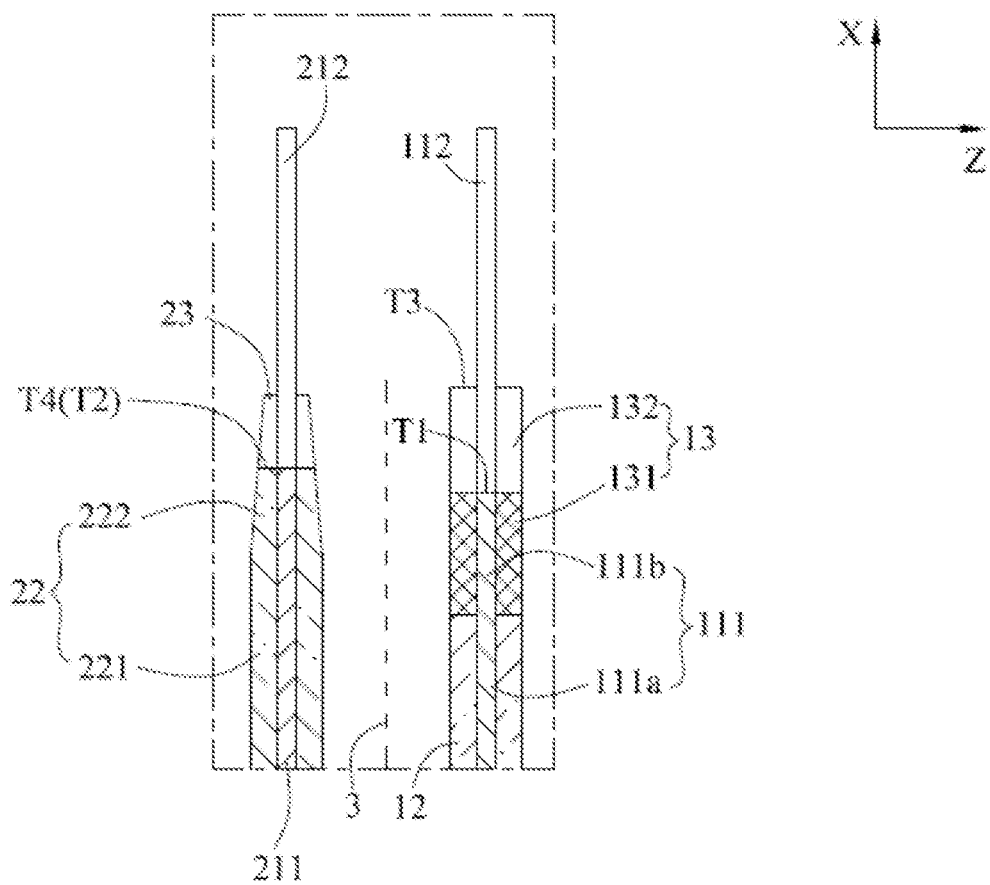
FIG. 14 is an enlarged view of an electrode assembly of FIG. 13 in a block F.
Figure 15:
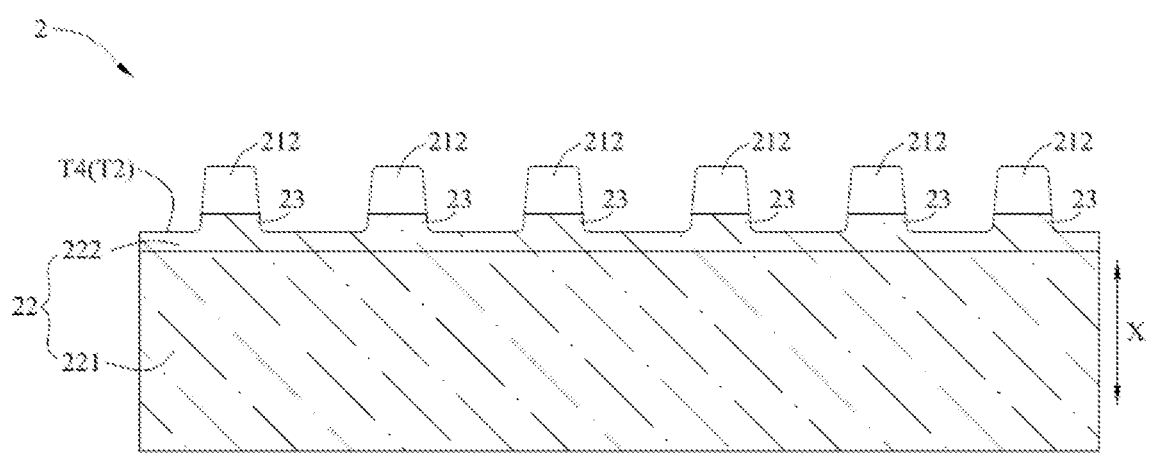
FIG. 15 is a schematic diagram of a second electrode plate in FIG. 13 in an unfolded state.

Referring to FIG. 14, in a direction of the substrate region 221 toward the thinned region 222, an edge T1 of a first transition region 111b farther away from a first coated region 111a extends beyond a joint between the substrate region 221 and the thinned region 222, and does not extend beyond the edge T4 of the thinned region 222 farther away from the substrate region 221. If the edge T1 of the first transition region 111b does not extend beyond the joint of the substrate region 221 and the thinned region 222, an active material in the thinned region 222 may be wasted. Although a smaller thickness of the thinned region 222 increases a gap between the first transition region 111b and the thinned region 222, a first portion 131 applied on the first transition region 111b can offset a safety risk resulting from the larger gap. Therefore, a requirement can still be met in this embodiment of this application.

In the second embodiment, a third active material layer 23 is connected to the thinned region 222. A thickness of the third active material layer 23 is less than the thickness of the substrate region 221. During cutting of the second tab 212, a larger size of the third active material layer 23 in the longitudinal direction X indicates a smaller size of the thinned region 222 in the longitudinal direction X. In this embodiment of this application, reducing the size of the thinned region 222 can reduce an overlapping area between the second active material layer 22 and the first transition region 111b, and reduce a risk of short circuits. Increasing the size of the third active material layer 23 can decrease a probability of bending a root of the second tab 212 and reduce a risk of short circuits. Based on comprehensive consideration, in a direction of the thinned region 222 toward the third active material layer 23, the size of the third active material layer 23 is greater than the size of the thinned region 222.

Referring to FIG. 14, in the longitudinal direction X, the edge T1 of the first transition region 111b shrinks to the second active material layer 22. Therefore, even if the root of the second tab 212 is bent, a risk of coming in contact with the edge T1 of the first transition region 111b is relatively small. Therefore, a risk of short circuits can be effectively reduced and safety performance is improved in this embodiment of this application.

Figure 16:
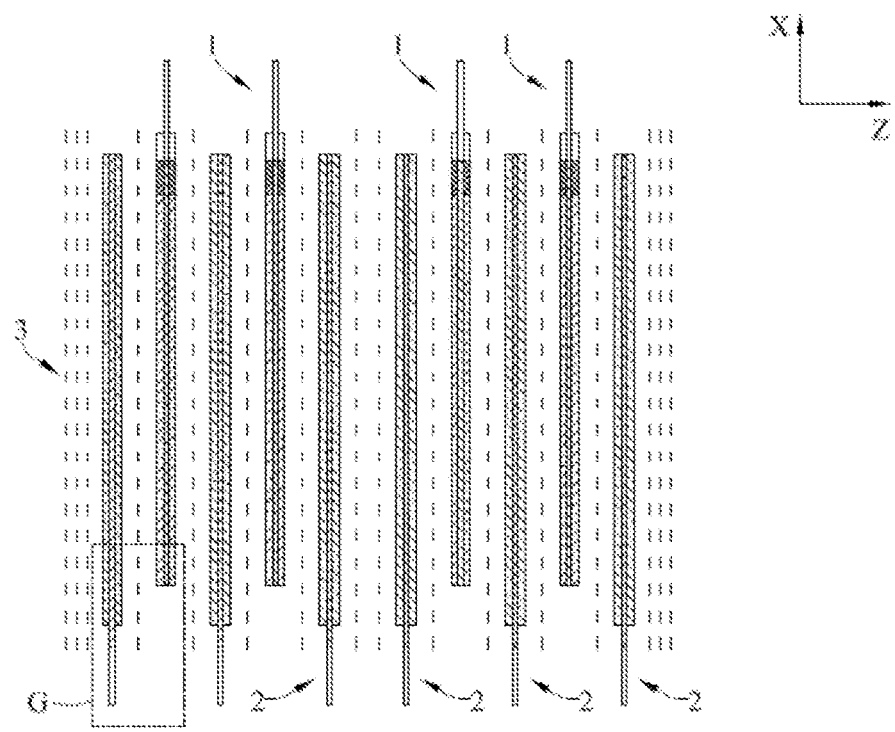
FIG. 16 is a schematic diagram of a third embodiment of an electrode assembly according to this application.
Figure 17:
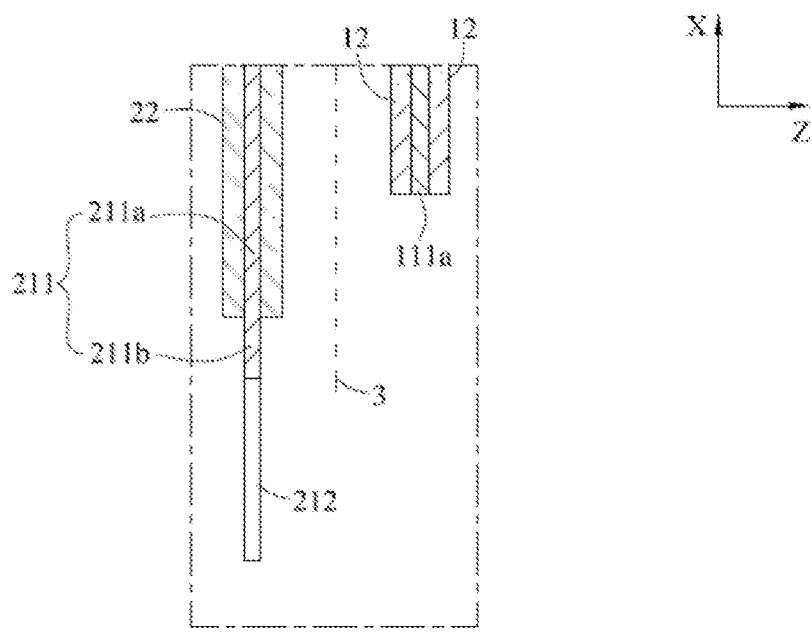
FIG. 17 is an enlarged view of an electrode assembly of FIG. 16 in a block G.
Figure 18:
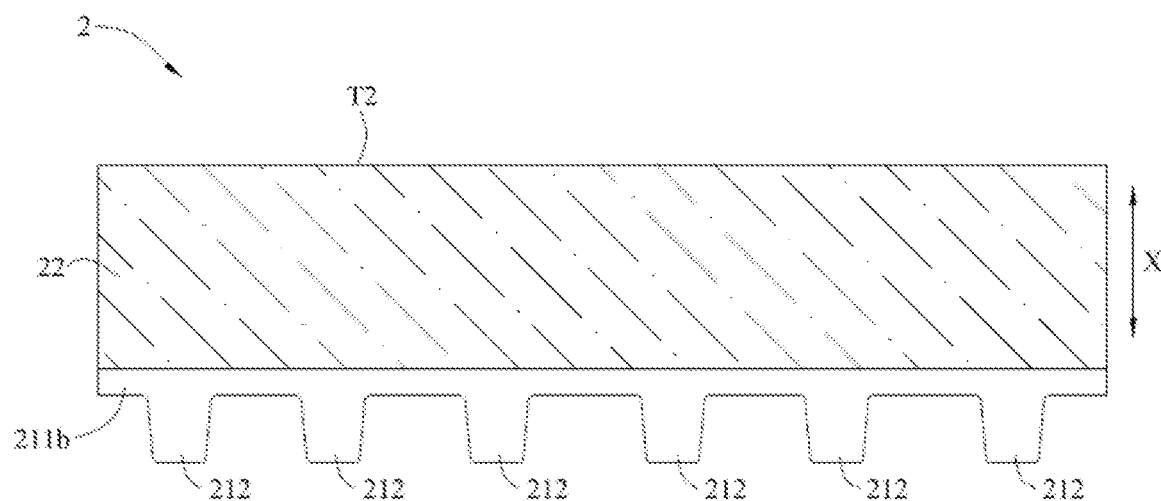
FIG. 18 is a schematic diagram of a second electrode plate in FIG. 16 in an unfolded state.

Referring to FIG. 16 to FIG. 18, compared with the first embodiment, the third active material layer 23 may be omitted in a third embodiment. Optionally, a second main body 211 includes a second coated region 211a and a second transition region 211b, and the second transition region 211b is disposed between a second tab 212 and the second coated region 211a. Specifically, a second active material layer 22 is applied on a surface of the second coated region 211a, and the second active material layer 22 is not applied on the second transition region 211b.

With the second transition region 211b, a cutting tool can be prevented from acting on the second active material layer 22 due to process errors. Compared with the first embodiment, the second active material layer 22 can be reduced in the third embodiment.

During vibration of a secondary battery, a current collecting member 8 pulls the second main body 211 through the second tab 212. If no second transition region 211b is provided, stress concentration occurs at a root of the second tab 212, and a portion of the second active material layer 22 close to the root of the second tab 212 is easy to fall off. In this embodiment of this application, with the second transition region 211b, an action force transferred to the second active material layer 22 can be reduced, to reduce a risk of falling-off of an active material of the second active material layer 22.

In another embodiment of this application, the secondary battery described above may be referred to as a battery cell.

What is claimed is:

1. An electrode assembly, comprising a first electrode plate and a second electrode plate; wherein
the first electrode plate comprises a first current collector and a first active material layer, the first current collector comprises a first main body and a first tab, the first tab extends from one end of the first main body in a longitudinal direction, and a size of the first tab in a lateral direction is smaller than a size of the first main body in the lateral direction, the lateral direction being parallel to the first current collector and perpendicular to the longitudinal direction;
the first main body comprises a first coated region and a first transition region, the first transition region is disposed between the first tab and the first coated region, the first active material layer is applied on a surface of the first coated region, the first active material layer is not applied on both the first transition region and the first tab, and a size of the first transition region in the lateral direction is same as a size of the first coated region in the lateral direction and greater than the size of the first tab in the lateral direction;
the second electrode plate comprises a second current collector and a second active material layer, the second current collector comprises a second main body and a second tab, the second tab extends from one end of the second main body in the longitudinal direction, and the second active material layer is applied on a surface of the second main body; and
in a direction of the first main body toward the first tab, an edge of the first transition region farther away from the first coated region does not extend beyond an edge of the second active material layer, and the edge of the first transition region farther away from the first coated region is a cutting edge for cutting the first tab.

2. The electrode assembly according to claim 1, wherein the first electrode plate is a positive electrode plate, the second electrode plate is a negative electrode plate, and in the direction of the first main body toward the first tab, the edge of the second active material layer extends beyond an edge of the first active material layer.

3. The electrode assembly according to claim 2, wherein in the direction of the first main body toward the first tab, the edge of the first transition region extends at least 0.5 millimeters beyond the edge of the first active material layer.

4. The electrode assembly according to claim 1, wherein the first electrode plate further comprises an insulation layer, and the insulation layer is at least partially applied on a surface of the first transition region.

5. The electrode assembly according to claim 4, wherein the insulation layer comprises a first portion and a second portion, the first portion is applied on the surface of the first transition region, and the second portion extends from the first portion and is applied on a surface of the first tab.

6. The electrode assembly according to claim 5, wherein in the direction of the first main body toward the first tab, an edge of the second portion farther away from the first portion extends beyond the edge of the second active material layer.

7. The electrode assembly according to claim 6, wherein in the direction of the first main body toward the first tab, the edge of the second portion farther away from the first portion extends 0.3 millimeters to 14 millimeters beyond the edge of the second active material layer.

8. The electrode assembly according to claim 4, wherein a hardness of the insulation layer is greater than a hardness of the first current collector.

9. The electrode assembly according to claim 4, wherein the insulation layer comprises an inorganic filler and a binder, and a weight ratio of the inorganic filler to the binder is 4.1 to 9.6.

10. The electrode assembly according to claim 1, wherein:
the first tab and the second tab are located on a same side of the electrode assembly in the longitudinal direction;
the second active material layer comprises a substrate region and a thinned region extending from the substrate region, and a thickness of the thinned region is less than a thickness of the substrate region;
in the longitudinal direction, the thinned region is connected to a side of the substrate region close to the second tab;
the second electrode plate further comprises a third active material layer, wherein the third active material layer is applied on a surface of the second tab and connected to the thinned region; and
in a direction of the thinned region toward the third active material layer, a size of the third active material layer is greater than a size of the thinned region.

11. The electrode assembly according to claim 1, wherein:
the second main body comprises a second coated region and a second transition region, and the second transition region is disposed between the second tab and the second coated region; and
the second active material layer is applied on a surface of the second coated region, and the second active material layer is not applied on the second transition region.

12. The electrode assembly according to claim 1, wherein the electrode assembly further comprises a separator, wherein the separator is used to isolate the first electrode plate from the second electrode plate.

13. A battery cell, comprising the electrode assembly according to claim 1.

14. The electrode assembly according to claim 4, wherein the insulation layer does not overlap with the first active material layer in a normal direction perpendicular to the first current collector.

15. An electrode assembly, comprising a first electrode plate and a second electrode plate; wherein
the first electrode plate comprises a first current collector and a first active material layer, the first current collector comprises a first main body and a first tab, the first tab extends from one end of the first main body in a longitudinal direction, and a size of the first tab in a lateral direction is smaller than a size of the first main body in the lateral direction, the lateral direction being parallel to the first current collector and perpendicular to the longitudinal direction;

the first main body comprises a first coated region and a first transition region, the first transition region is disposed between the first tab and the first coated region, the first active material layer is applied on a surface of the first coated region, the first active material layer is not applied on both the first transition region and the first tab, and a size of the first transition region in the lateral direction is same as a size of the first coated region in the lateral direction and greater than the size of the first tab in the lateral direction;

the second electrode plate comprises a second current collector and a second active material layer, the second current collector comprises a second main body and a second tab, the second tab extends from one end of the second main body in the longitudinal direction, and the second active material layer is applied on a surface of the second main body;

in a direction of the first main body toward the first tab, an edge of the first transition region farther away from the first coated region does not extend beyond an edge of the second active material layer;

the first tab and the second tab are located on a same side of the electrode assembly in the longitudinal direction;

the second active material layer comprises a substrate region and a thinned region extending from the substrate region, and a thickness of the thinned region is less than a thickness of the substrate region;

in the longitudinal direction, the thinned region is connected to a side of the substrate region close to the second tab; and in a direction of the second main body toward the second tab, a boundary between the substrate region and the thinned region is beyond an edge of the first coated region.

* * * * *